July 7, 1925.
A. J. INGERSOLL
1,545,258
RIM CONTRACTOR AND EXPANDER
Filed Dec. 29, 1923  2 Sheets-Sheet 1
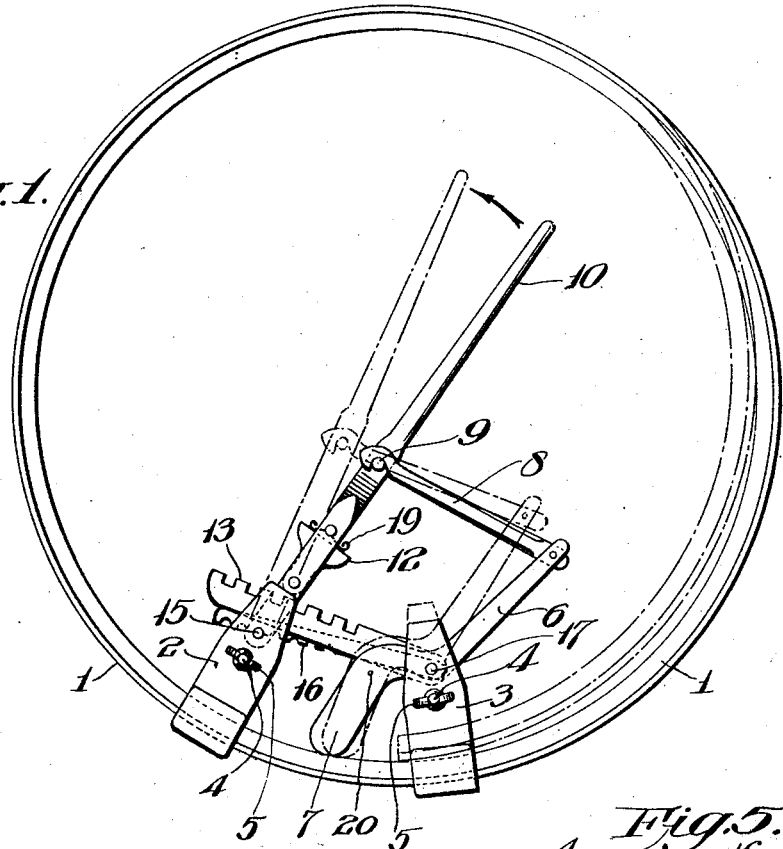
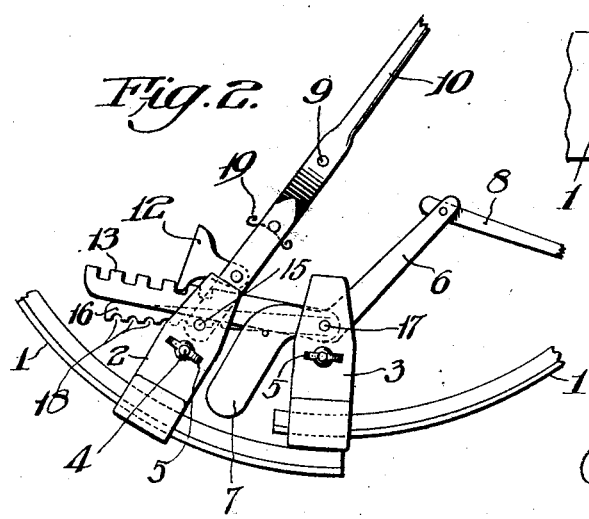
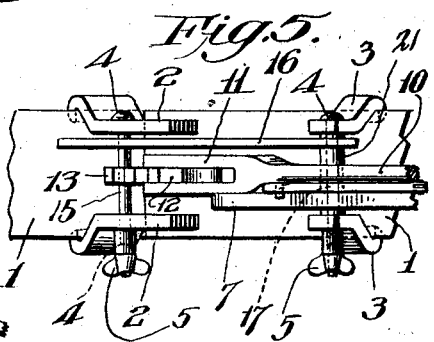
INVENTOR:
Andrew J. Ingersoll
BY Wiedersheim & Fairbanks
ATTORNEYS.

July 7, 1925.
A. J. INGERSOLL
1,545,258
RIM CONTRACTOR AND EXPANDER
Filed Dec. 29, 1923   2 Sheets-Sheet 2
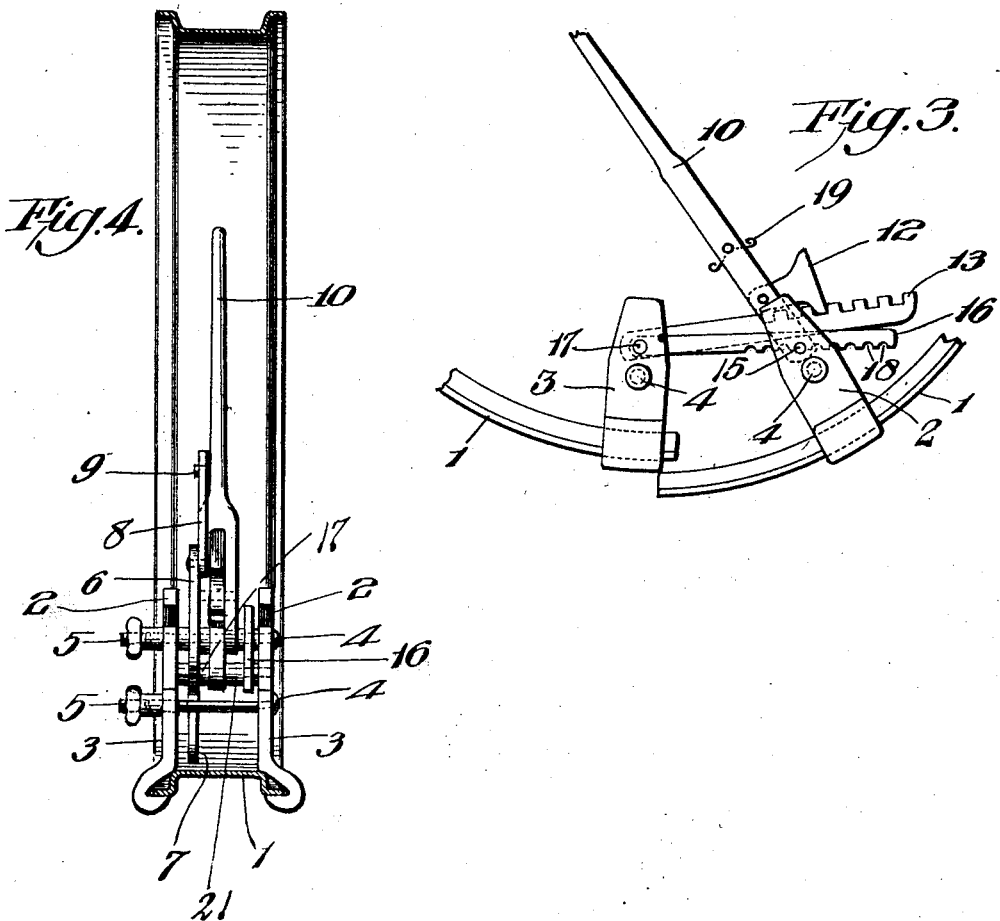
INVENTOR
Andrew J. Ingersoll
BY
ATTORNEYS.

Patented July 7, 1925.

1,545,258

UNITED STATES PATENT OFFICE.

ANDREW J. INGERSOLL, OF WILDWOOD, NEW JERSEY.

RIM CONTRACTOR AND EXPANDER.

Application filed December 29, 1923. Serial No. 683,292.

*To all whom it may concern:*

Be it known that I, ANDREW J. INGERSOLL, a citizen of the United States, residing at Wildwood, county of Cape May, State of New Jersey, have invented a certain new and useful Rim Contractor and Expander, of which the following is a specification.

This invention, generally stated, relates to automobile accessories and has more especial relation to a split-rim contracting and expanding device for use when removing or replacing a tire with respect to its rim.

The leading object of the present invention is to provide a relatively simple and efficient device of the character stated which may be quickly applied to and removed from a tire-rim, and which, because of its novel system of leverage, may be operated with but little exertion. Other and further objects relate to the provision of general details of construction and in the arrangement, combination and connection of parts for attaining the results sought by said leading object. Other and further objects will appear hereinafter.

The invention consists of the improvements hereinafter described and finally claimed.

The nature, characteristic features and scope of the invention will be more fully understood from the following description taken in connection with the accompanying drawings forming part hereof, and in which:

Fig. 1, is a view in side elevation of a split-rim showing the device of the invention as applied thereto.

Fig. 2, is a fragmentary view, in side elevation, of a split-rim as contracted by means of said device.

Fig. 3, is a similar view, looking from the opposite side.

Fig. 4, is a view in end elevation of the device of the invention as applied to a split-rim, the rim being cross-sectioned, and Fig. 5, is a top or plan view of the device as applied to a rim.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawings in detail, the numeral 1 designates a demountable rim, split so as to have two ends which abut in a substantially radial plane. Any conventional type of means for interlocking said ends may be present. For separating such rim ends to facilitate removal and replacement of a tire use is made of the device about to be described. The numerals 2—2 and 3—3 designate two sets or pairs of clamps having hook-like jaws to closely fit the inside surface of the rim. Each pair of clamps is secured with respect to a rim by means of bolts 4 and nuts 5. Pivoted between one pair of clamps, those designated 3—3 in the drawings, is a rim-displacing lever 6 having a foot-portion 7 at one end for engaging a rim and having pivotal connection at its opposite end with a rod 8. This rod 8 at its free end is substantially hook-shaped for freely engaging over a lateral pin 9 fixed to operating lever 10. The operating lever has a bifurcated or forked end 11, see Figs. 4 and 5, which has pivotal relation between the clamps 2—2. Between the tines of the forked portion of the operating lever is pivoted a dog or pawl 12 for cooperatively engaging with a rack-bar 13, as shown in Fig. 2, for drawing clamps 3—3 toward clamps 2—2 thereby causing the rim ends to overlap. The rack-bar is pivoted with respect to clamps 3—3, passes between the tines of the forked, operating lever and is supported at its opposite end upon the pivot rod 15 of the operating lever. Between the two pairs of clamps is arranged a lock-bar 16, one end of which is pivoted to the rod 17 to which the lever 6 is pivoted and the opposite end of which is notched as at 18 upon its underside for engagement with the pivot-rod 15. Washers 21 are arranged upon rod 17 to space the various parts. Thus the two sets of clamps may be temporarily interlocked to maintain the ends of the split-rim in the position shown in Fig. 2, with the foot 7 free of the rim and rod 8 free of the operating lever.

In use of the above described device, when it is desired to collapse a rim for tire removal, the clamps 2—2, 3—3, and other parts are positioned as shown by full lines in Fig. 1. The operating lever 10 is then moved in the direction of the arrow in Fig.

1, to cause the foot 7 to forcibly engage an end of the rim and thereby cause disengagement of the rim ends, as shown by dotted lines. In this position of parts the pawl 12 is in engagement with the spring 19 upon the rack-bar.

The pawl 12 is now caused to engage with the teeth of the rack-bar, the rod 8 disengaged from pin 9 of lever 10 and the latter moved about its pivot point, to the left in Fig. 1, to cause the rack-bar to draw clamps 3—3, as attached to one end of rim 1, toward clamps 2—2 thus causing the rim ends to overlap as shown in Fig. 2. During this movement the notched end of lock-bar 16 freely rides over the pivot rod 15 until a position of rest is assumed by the operating lever at which time a lock-bar notch engages said rod 15 to maintain the parts in interlocked position with the foot 7 free of the rim 1. In this position of parts a rim is contracted to the proper degree for the ready, convenient and expeditious removal of a tire. With the parts still in this position another tire may be secured to place, whereafter, the pawl 12 is disengaged from rack-bar 13, moved about its pivot-point so as to engage the rack-bar upon the portion opposite to that previously engaged. The operating lever is then moved to the right in Fig. 2, to cause the rack-bar 13 to move the clamps 3—3 toward the right until the previously disengaged end of the rim reseats itself with respect to that end of the rim to which clamps 2—2 are attached. During this movement the lock-bar may be caused to move over the pivot rod 15. The foot 7, lever 6 and rod 8 do not function during this movement of parts. The numeral 20 designates a lateral stop upon foot 7 to limit movement of lever 6 toward the right in Fig. 2. The above described device is primarily adapted for garage work where rapid and efficient workmanship is essential.

The clamps 2 and 3, hereinbefore referred to, are of novel form, each having hook-like jaws whose inner faces are beveled so that where rims having flanged portions of varying diameters are employed the said beveled faces will readily adjust themselves to such varying diameters. Furthermore, the beveled faces abut against the inner annular flange of the rim, so that when the clamp-nuts are properly tightened said beveled faces ride toward each other on the inner flanges of the rim and so automatically wedge themselves on said flanges causing the clamps to take increased hold of the sections of the rims and accordingly firmly grip the same.

Having thus described my invention, what I claim as new and desire to secure by Letters Patent, is:

1. A rim collapsing and expanding device comprising clamps adapted to engage the ends of a transversely divided rim, a rim displacement member operatively connected to one of said clamps, an operating lever connected to the other of said clamps and operatively connecting with said displacement member for collapsing said rim parts, a rack-bar carried by the clamp which supports the displacement member, and a pawl carried by said lever for engaging with the rack-bar to advance said clamps toward or away from one another.

2. A rim collapsing and expanding device comprising two pairs of clamps adapted to engage the ends of a transversely divided rim, a rim displacement member having pivotal relation between one pair of said clamps, an operating lever having a forked end pivoted between the other pair of said clamps, a link operatively connecting said member and lever, a rack-bar pivoted between the first mentioned clamps and extended through said fork end of the operating lever and a pawl carried by said lever for co-acting with said rack-bar.

3. A rim collapsing and expanding device comprising two pairs of clamps adapted to engage the ends of a transversely divided rim, a rim displacement member pivoted between one pair of said clamps, an operating lever having a forked end pivoted between the other pair of said clamps, a link operatively connecting said member and lever, a rack-bar pivoted between the first mentioned clamps and extended through the forked end of the operating lever, a pawl carried by said lever for co-acting with said rack-bar and a lock-bar pivoted to the first mentioned clamps and adapted to engage with a fixed part upon the last mentioned clamps.

In testimony whereof I hereunto sign my name.

ANDREW J. INGERSOLL.

Witnesses:
 JOHN A. WIEDERSHEIM,
 WILLIAM J. JACKSON.